Figure 1:
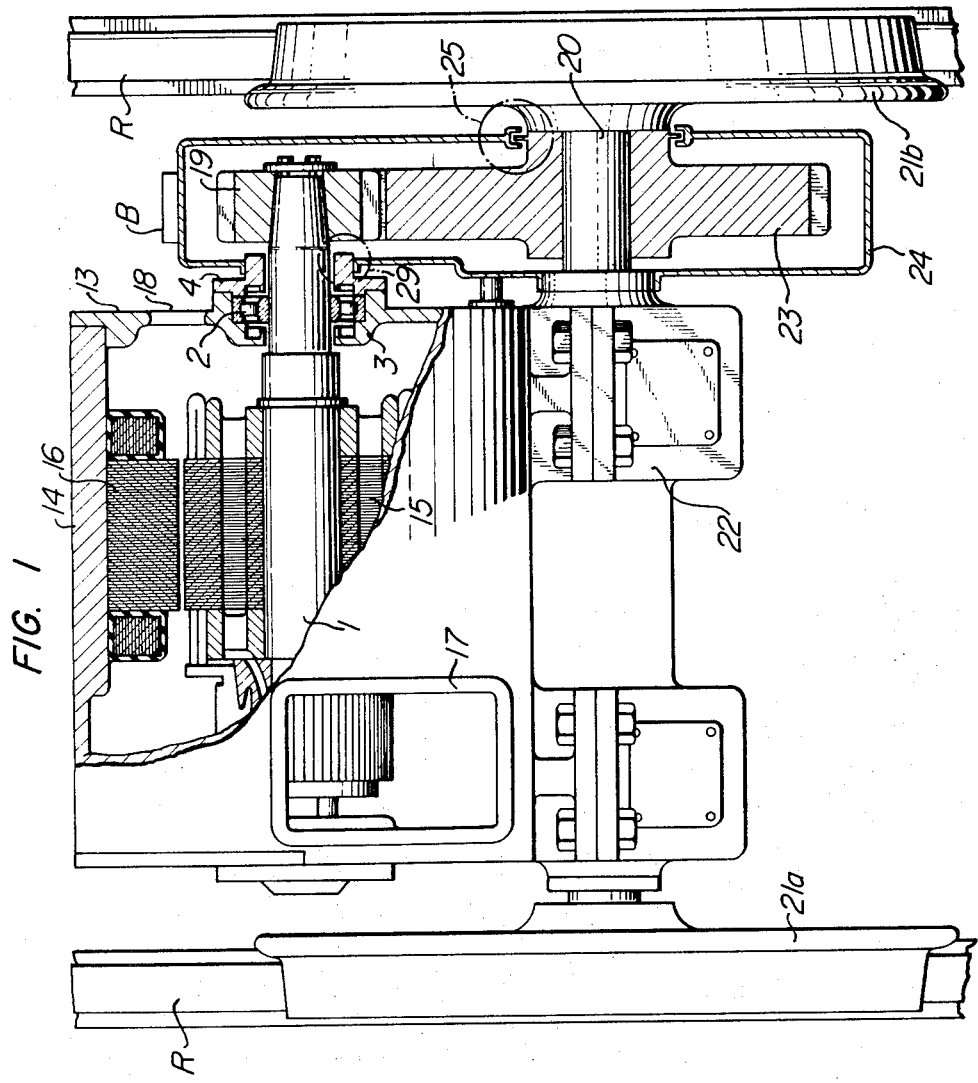

United States Patent [19]
Nakamura et al.

[11] 3,805,919
[45] Apr. 23, 1974

[54] SEALING DEVICE FOR ROTARY MACHINE

[75] Inventors: Toshio Nakamura; Hidetoshi Arii; Shozo Tatekawa; Hitoshi Egawa, all of Hitachi; Masao Yuzawa, Katsuta; Hideji Itabashi; Chuji Konno, both of Hitachi, all of Japan

[73] Assignee: Hitachi, Ltd., Tokyo, Japan

[22] Filed: Oct. 14, 1971

[21] Appl. No.: 189,349

[52] U.S. Cl................. 184/6 R, 277/3, 277/DIG. 1, 308/187.1
[51] Int. Cl............................................. F16n 1/00
[58] Field of Search............ 308/36.3, 187.1; 277/DIG. 1, 70, 71, 3; 184/6 R, 6.12; 74/606 R

[56] References Cited
UNITED STATES PATENTS

| | | |
|---|---|---|
| 1,957,054 | 5/1934 | Waldorf................ 308/187.1 X |
| 2,125,446 | 8/1938 | Hurtt.................... 308/36.3 |
| 2,407,807 | 9/1946 | Bentley................. 277/3 X |
| 3,470,655 | 10/1969 | Swigert................ 308/36.3 X |
| 3,645,544 | 2/1972 | Unsworth et al........ 277/DIG. 1 |
| 3,679,278 | 7/1972 | Lucas................... 308/187.1 |
| 2,326,824 | 8/1943 | Browne et al.......... 277/3 |
| 3,650,582 | 3/1972 | Casey................... 308/36.3 |
| 3,605,946 | 9/1971 | Oehl.................... 184/6.12 |

*Primary Examiner*—Manuel A. Antonakas
*Attorney, Agent, or Firm*—Craig and Antonelli

[57] ABSTRACT

A sealing device for a rotary machine, such as a motor for vehicle, which prevents transfer of air from a bearing assembly to a gear box or vice versa thereby to isolate the two components from each other and from the other parts therearound. The sealing device being particularly adapted for an arrangement in which a rotating shaft extends through the bearing assembly or gear box, in that a jet of air is supplied to the portion of the bearing assembly or gear box through which the shaft extends, so that an air layer with a pressure sufficiently higher than that around the portion through which the shaft extends is formed to isolate the bearing assembly and gear box from the surroundings thereby to prevent leakage of lubricant from, and ingress of dust and water drops from the outside into, the two components.

13 Claims, 4 Drawing Figures

INVENTORS
TOSHIO NAKAMURA, HIDETOSHI ARII, SHOZO TATEKAWA, HITOSHI EGAWA,
MASAO YUZAWA, HIDEJI ITABASHI, CHUJI KONNO

BY Craig, Antonelli & Hill
ATTORNEYS

SEALING DEVICE FOR ROTARY MACHINE

Rotary machines, for example electric motors for vehicles, are provided with a gear on one end of the motor shaft, the gear being meshed with a gear on an wheel axle to transmit driving torque to the latter. To smoothen the motions of the intermeshing gears of the shaft and axle and also to minimize the wear of these gears, lubricating oil must be supplied. For these purposes, a gear box is provided so as to contain lubricating oil and avoid spattering of the oil away from the gear surfaces to the surrounding components. Even if the gears are encased in the box, however, a motor shaft or an wheel axle, if extended through the box, will necessarily produce a gap between itself and the gear box. The gap tends to allow the oil drops or mist thrown away from the gears to leak out or, conversely, allow dust and water drops from the outside to enter the gear box. In an attempt to eliminate these shortcomings, it has been customary to fit a packing in the gap between the shaft and the gear box. The packing is usually supported by the stationary component, or the gear box, and is kept in contact with the shaft in such a way as to provide no obstacle at all to the rotation thereof. Such a packing proves effective, indeed, for stationary parts, but, when used in contact with a moving part, such as a rotating shaft, it tends to be worn or caused to develop heat to a serious degree by the sliding contact with the moving part. Moreover, the probability is that lubricating oil deposited on a packing which has been more or less deteriorated by the wear or heat development would absorb the dust from the atmosphere, thus losing the sealing effect due to accelerated deterioration. This eventually makes it impossible to prevent the oil leakage from the gear box as well as the ingress of dust and moisture from the outside into the gear box. The oil leakage will cause inadequate lubrication of the gears with insufficient oil and result in premature wear of the gears and increased noise. In addition, the oil that has leaked out will stain the adjacent parts. On the other hand, the dust and water drops that have gained entrance into the gear box will accelerate the deterioration of the lubricating oil, which again will lead to inadequate lubrication and hence premature wear of the gears inside.

While the foregoing description is about a typical arrangement of rotary machines in which a rotating shaft extends through a gear box, the same applies to an alternative arrangement in which the shaft extends through a bearing assembly. For example, a bearing assembly of a motor for a vehicle which uses a rolling contact bearing having rolling elements such as rollers or balls between the inner and outer races, is usually formed with lubricant chambers to be packed with grease on both sides of the bearing, and the both sides of the bearing together with the chambers are covered with a bearing cover and a part of the bearing box. A shaft extends through the bearing cover and that part of the bearing box. It is also customary practice that electric motors for the rolling stock are forcedly ventilated with air for cooling the inside of the motors. When such a motor is running at a low speed, the pressure exerted for the cooling purpose will make the air pressure inside the motor higher than the atmospheric pressure outside. Accordingly, a positive pressure is applied to a narrow gap in the portion of the bearing assembly through which the shaft in the motor extends, for example, a gap defined between the shaft and a part of the bearing box (or bearing cover), with the advantage of avoiding any leakage of grease from the bearing assembly into the motor. At the same time, however, part of the cooling air that enters the motor from the portion of the bearing assembly through which the shaft in the motor extends flows out along the shaft end portion protruding beyond the motor, thus causing leakage of grease therewith. As a result, the portion of the bearing assembly outside of the motor is badly stained with the leaking grease, and minute particles of dust from the air being circulated through the bearing assembly deposit on the grease packed in the surrounding parts of the rolling-contact bearing, thereby deteriorating the grease quality. It is, therefore, desirable that air should be kept from being circulated through the bearing assembly.

When the motor is running at a high speed, the fanning action of the rotor is great and a considerable negative pressure is applied around the rotating shaft. The pressure is fairly lower than the atmospheric pressure outside of the motor, sometimes reaching −250 mmAq. The bearing assembly located adjacent the shaft is naturally subjected to this negative pressure; the effect of avoiding the leakage of grease by means of the cooling air as attained during the low-speed operation is no longer observed, but, on the contrary, the grease is drawn by suction from the bearing assembly into the motor. The leakage of grease in the face of the negative pressure applied in the neighborhood of the shaft is ascribed to the fact that the portion of the bearing assembly opposed to the outer side of the motor is not closed but has an opening through which the shaft extends, and the external air flows, together with the grease from the bearing assembly, along the shaft into the motor wherein the pressure is lower. Consequently, the motor is made greasy inside and its insulation is deteriorated by subsequent deposition of impurities. Furthermore, the grease inside the bearing assembly is seriously affected by the intrusion of the external air that contains dust and moisture. The rolling-contact bearing in the bearing assembly, too, may be damaged or otherwise affected by these impurities. It is to be noted that, aside from the variation of air pressure, natural effluence of aged grease can also be responsible for the leakage of grease from the bearing assembly.

So far an arrangement in which a bearing assembly and a gear box are located apart. In reality the bearing assembly and gear box are sometimes arranged close to each other, even a part of the gear box being connected to the bearing assembly. In such a case, the shaft that extends through the bearing assembly outwardly of the motor is covered by the gear box. This eliminates the both possibilities of the external air directly intruding into the bearing assembly and the air directly flowing out of the motor through the bearing assembly. Thus, the air necessarily flows through the bearing assembly and the gear box. If the pressure of air in the portion of the bearing assembly accommodated in the motor is higher than the air pressure outside, the air from the bearing assembly will enter the gear box and flow out through the gap of the gear box. As a consequence, the grease from the bearing assembly will flow into the gear box, and the lubricating oil from the gear box will leak out. Conversely if the pressure of air in the portion of the bearing assembly accommodated in the motor is lower than the air pressure outside, the external air will be drawn into the motor via the gear box and bearing assembly, with the result that the lubricating oil from the gear box will flow into the bearing assembly, and the grease from the bearing assembly will leak out into the motor. Now, in many cases, rolling-contact bearings are lubricated with grease, and gears with mineral oils or gear compounds. These lubricants for bearings and gears have a common tendency of losing much of their viscosity due to agitation and temperature rise during operation; in particular, the lubricants in gear boxes tend to be liquefied. For this reason a lubricant in a gear box may be caused to leak out, for example into the bearing assembly, by a slight variation of the pressure. Usually the lubricant used in a bearing assembly is quie dissimilar in nature and properties to the lubricant in a gear box. When mixed together, they will give a chemically deteriorated lubricant with shortened life.

It is an object of the present invention to provide a sealing device for rotary machines which is simple in construction and is capable of maintaining a lasting sealing effect.

Another object of the invention is to provide a sealing device for rotary machines which can avoid mixing of dissimilar lubricants.

Still another object of the invention is to provide a sealing device for rotary machines which can achieve a well-balanced sealing effect.

Further objects of the invention will become apparent from the following description taken in conjunction with the accompanying drawings showing embodiments thereof.

Briefly, the present invention is characterized in that, in an arrangement comprising a bearing assembly which supports a rotating shaft, and a gear box which accommodates intermeshing gears, a jet of air is supplied to the portions of the bearing assembly and the gear box through which the shaft extends.

Figure 2:
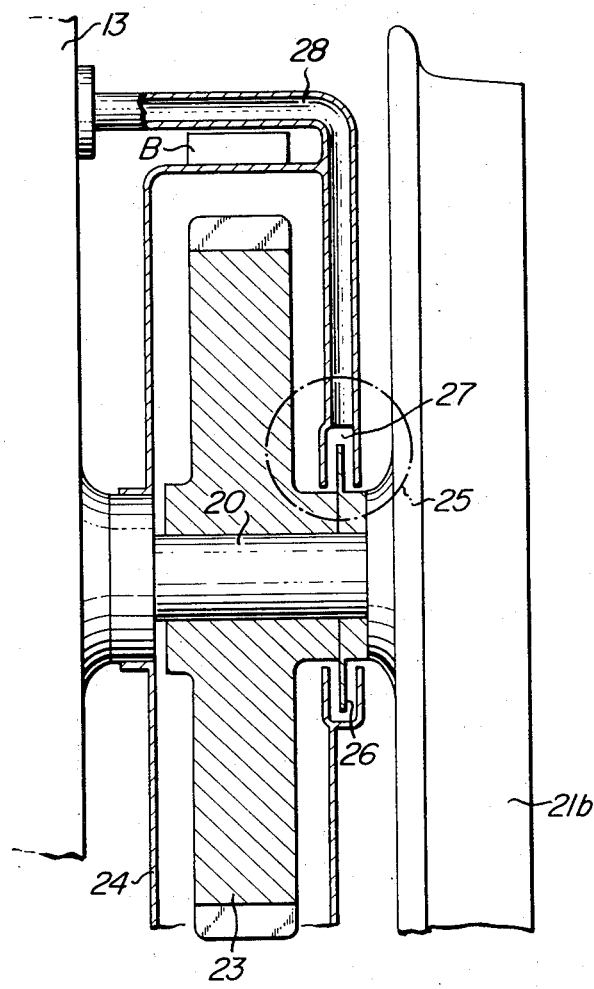
Figure 3:
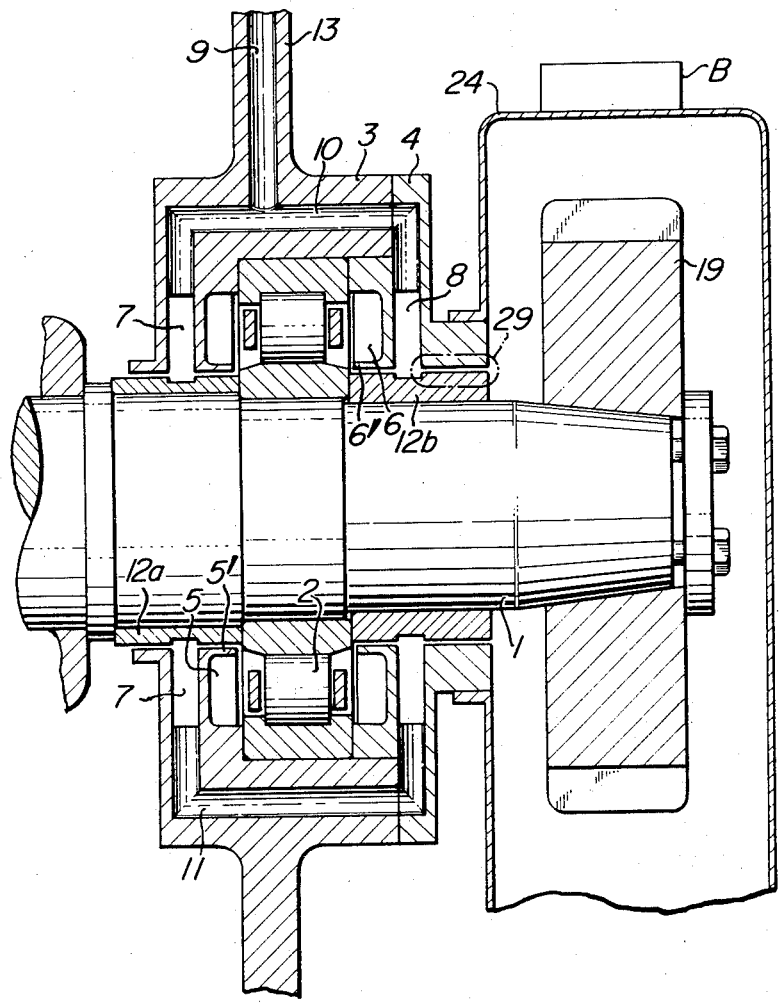
Figure 4:
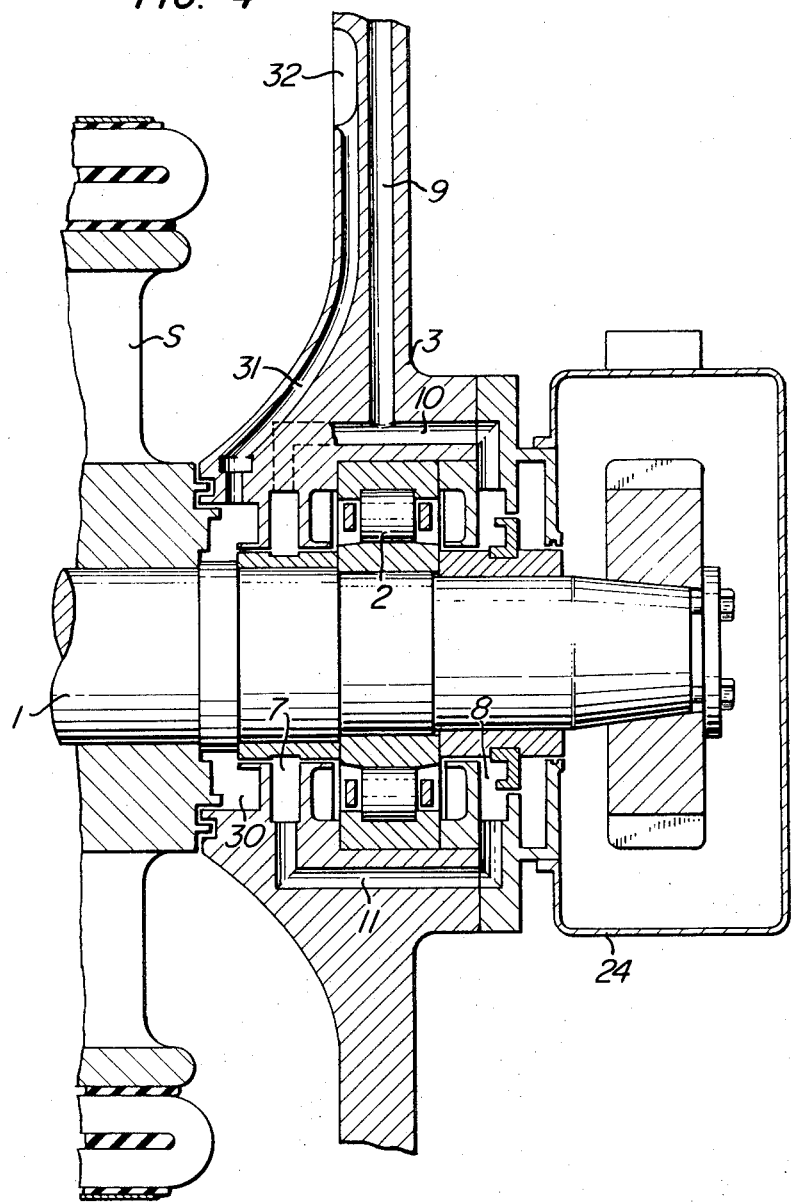

In the drawings:

FIG. 1 is a diagrammatic plan view of an electric motor for vehicle, partly broken away; and FIGS. 2 to 4 are views, partly in section, of motors equipped with sealing devices for rotary machines embodying this invention.

Referring to FIG. 1 there is shown an electric motor for a vehicle as comprising a stator 16, a rotor 15 opposed to the stator 16, a rotating shaft 1 which carries the rotor 15, and a bearing assembly which revolvably supports the shaft 1. On an end portion of the shaft 1 is mounted a gear 19 which, in turn, meshes with a larger gear 23 on an wheel axle 20.

The rotating shaft 1 is shown as disposed horizontally and is rotatably supported at one end by a rolling-contact bearing 2 which, in turn, is accommodated in a bearing box 3. As shown in section, each bearing box 3 supports the antifriction bearing 2 and covers one side of the bearing 2. The other side of the bearing 2 is covered with a bearing cover 4, which is secured to the bearing box 3. The bearing box 3 and the bearing cover 4 which cover the both sides of each bearing 2 are formed with grease chambers (indicated at 5 and 6, respectively, in FIG. 3) facing the respective sides of the bearing 2. These chambers are so formed as to keep the grease packed therein from being agitated by the rotation of the shaft 1. The bearing box 3 is formed integrally with an end plate 13 which, in turn, is secured along its periphery to the end of a stator frame 14, as with bolts. To the inner surfaces of the stator frame 14 is fixed the stator 16 opposite to the rotor 15. As shown, the end plate 13 and the stator frame 14 are provided with vent holes 17, 18, respectively, for circulation of cooling air.

While the motor for use in railway service is constructed in the manner above described, it alone cannot drive a vehicle. In order that the motor should serve as such, one end of the motor shaft 1 is extended out of the motor to carry a gear 19 thereon and, furthermore, a larger gear 23 to mesh with the gear 19 is mounted on an wheel axle 20. On the both ends of the wheel axle 20 are mounted wheels 21a, 21b, which are adapted to roll on rails R. The wheel axle 20 itself is rotatably supported by bearing boxes 22 which, in turn, are formed integrally with the stator frame 14 of the motor.

With the construction above described, the revolution of the motor is transmitted to the wheels 21a, 21b, and it follows that the motor, if installed on the chassis of a car, will permit running of the vehicle.

Here it is noted that, although the gears 19, 23 simply in mesh with each other can transmit the torque of the motor to the wheels 21a, 21b, the transmission involves such a great friction of the intermeshing gears that the torque is not smoothly passed on to the wheels and, in addition, the friction accelerates the wear of the both gears and causes increasing noise. Thus, the intermeshing portions of the gears 19, 23 need to be lubricated with a suitable lubricant. For this reason a gear box 24 is provided which encloses the both gears. The gear box 24 is filled with a lubricant to such a level that the gears 19, 23 are partly immersed therein and are lubricated as the lubricant is splashed up by the revolution of the gears themselves. Since the gear box 24 is supported by securing to a bearing box 22 of the wheel axle 20 and to the bearing cover 4, it is necessary that the connected portions of the box are airtightly sealed lest any flow of air should take place. To maintain this airtightness is relatively simple because the bearing cover 4, bearing box 22, and gear box 24 are all stationary members. However, the side of the gear box 24 opposite to the side supported by the bearing box 22 merely allows the axle 20 to extend therethrough, and it is unfeasible to establish any airtight seal on this side. The gear box 24 is formed with a vent hole B which is intended only for circulation of air.

With the foregoing construction it is inevitable that some of the lubricant, for example the mineral oil deposited on different parts within the gear box 24 by the agitation during operation, leaks out through a gap 25 between the gear box 24 and the wheel axle 20 and that, conversely, water drops and the external air gain entrance into the gear box 24. In view of this, the present invention teaches that, as shown in FIG. 2, air should be constantly forced out of the entire zone where the gear box 24 and the wheel axle 20 defines the gap 25, as long as the motor is running. More particularly, an annular air chamber 27 is formed by the portion of the gear box 24 that approaches the axle 20 in such a manner that the chamber 27 faces the wheel axle 20. The air chamber 27 is communicated to an air duct 28 through which air can be injected into the chamber.

Constructed in this way, the air chamber 27 is constantly supplied with a jet of air, which is then released both inwardly and outwardly of the gear box 24. Thus, the air released inwardly of the gear box 24 forces the mineral oil coming toward the gap 25 between the gear box 24 and the axle 20 back to the inner zone of the gear box 24 and then the air leaves the box through the vent hole B. On the other hand, the air released out of the gear box 24 avoids the ingress of dust, water drops, etc. and scatters them away. As the means to supply a constant jet of air into the air chamber 27, part of the air that cools the inside of the motor may be used. The simplest way to achieve this is to provide the air duct 28 in such a manner that it opens at one end in the direction where cooling air passes through the vent hole 18 formed in the end plate 13 of the motor, although the means need not be limited to this particular arrangement. It is also possible to provide independent blower means (not shown) at the end of the air duct 28 to supply the jet of air into the air chamber 27.

The seal thus established inside and outside of the outer wall of the gear box by the jet of air involves no mechanical action, for example the physical contact and sliding as of a conventional packing with other parts. Therefore, the seal according to this invention maintains the sealing effect for a long period of time; the running of the axle at the highest possible speed will not vitiate the sealing effect.

The sealing effect is promoted by providing a flinger 26 which is extended from the axle 20 into the air chamber 27, because it rectifies the air streams released inwardly and outwardly of the gear box 24.

In the foregoing arrangement, the gear box 24 is supported by the bearing box 22 of the wheel axle 20 and by the bearing cover 4, and the wheel axle 20 is the only shaft that extends through the gear box 24, with a gap left in between. However, in an arrangement which includes, in addition to the wheel axle 20, another rotating shaft which extends outwardly through the gear box 24, it is necessary to provide an air chamber similar to the one above described, through the outer wall of the box where the shaft protrudes, to permit effluence of air therethrough.

In this way the oil leakage from, and the ingress of dust and moisture into, the gear box 24 are prevented. The gear box 24 is formed with a portion (as indicated at 29 in FIG. 1) in communication with the bearing assembly along the rotating shaft 1. This communicating portion 29 may cause the flow of oil from the gear box 24 into the bearing and/or the flow of grease from the bearing assembly into the box. Such an undesired flow of the grease and oil may take place either naturally by gravity or otherwise or due to variations of the pressures outside and inside of the motor.

An arrangement devised to preclude the unintended flow of grease and oil is illustrated in FIG. 3. Like the embodiment already described in general with reference to FIG. 1, the arrangement includes a rotating shaft 1 which is journaled in rolling-contact bearings 2 and held in position with rings 12a, 12b. The bearing 2 is mounted in a bearing box 3 formed in one place with an end plate 13, the both sides of the bearing being covered with a part of the bearing box 3 and by a bearing cover 4. The bearing box 3 and the bearing cover 4 are formed with lubricant chambers 5 and 6, respectively, which are packed with grease and located opposite to the corresponding sides of the bearing 2. A gear 19 is mounted on the end portion of the shaft 1 which extends through the bearing 2. A gear box 24 which accommodates the gear 19 is secured to the bearing cover 4. In such an arrangement, the bearing assembly and the gear box 24 are communicated to each other through a gap 29 between the bearing cover 4 and the ring 12b. Therefore, in accordance with this invention, an annular air chamber 8 is defined between the lubricant chamber 6 and the gear box 24 as if to surround the ring 12b, so that air is injected into the air chamber 8 via passages 9 and 10.

With the construction described, air is constantly injected into the air chamber 8 while the motor is running, so that the oil which otherwise flows out of the gear box 24 through the gap 29 is forced back to the box by the air. The air that has entered the gear box 24 in this way through the gap 29 is released to the atmosphere by way of a vent hole B.

Of the grease packed in the lubricant chamber 6 and adhering to the rolling contact bearing 2, the softened and deteriorated portions tend to flow into the air chamber 8 through the gap between the inner peripheral wall 6' of the lubricant chamber 6 and the ring 12b. This tendency is easily hampered, however, because the air pressure inside the air chamber 8 is kept higher than that in the bearing assembly by the continuous supply of air and, therefore, the air from the chamber 8 acts against the gap between the peripheral wall 6' and the ring 12b to push back the grease.

In the manner described the flow of oil from the gear box 24 into the bearing assembly and the flow of grease contrariwise are both prevented. However, if the motor in this state was sped up, the pressure of air around the motor shaft 1 would become negative, with the result that the grease in the lubricant chambers 5, 6 and the rolling-contact bearing 2 would be drawn out into the motor. Moreover, the difference between the air pressures in the air chamber 8 and in the vicinity of the shaft 1 inside the motor would be increased to such a great extent that the air from the air chamber would gush out, forcing the grease from the bearing assembly into the motor.

In view of this, an annular air chamber 7 is formed, in accordance with this invention, around the ring 12a and between the motor and the lubricant chamber 5 of the bearing box 3 which covers one side of the rolling-contact bearing 2, so that air can be injected into this chamber 7. Therefore, the air from the air chamber 7 acts against the gap between the ring 12a and the inner peripheral wall 5' of the lubricant chamber 5 to avoid the leakage of grease and, when the pressure of the air around the shaft 1 in the motor is negative, only the air from the air chamber 7 is released into the motor. If the air pressure inside the motor is increased to such a degree as to permit the flow of air into the bearing assembly, the pressure is offset by the air pressure inside the air chamber 7 to avoid any flow of the air from the motor into the bearing assembly.

For the supply of air to the air chamber 7, the passages 9 and 10 leading to the air chamber 8 which is formed in the bearing cover 4 may be utilized. By so doing the number of accessory parts to be required can be minimized to an advantage. Thus, the air chambers 7 and 8 provided on the both sides of the rolling-contact bearing 2 are communicated to each other with the passage 10, which, in turn, is connected to a passage 9 in communication to an air source.

It must be noted that, when the air chambers 7 and 8 are provided on the both sides of the bearing 2 and jets of air are supplied thereto, the air pressures in the two chambers must be kept equal. Otherwise, a flow of air across the bearing 2 will be produced between the air chambers 7 and 8, with the consequence that grease will leak out of the bearing into either chamber, eventually causing seizure of the bearing due to the lack of grease. The difference between the air pressures in the air chambers 7 and 8 can result from the flow resistance of the passage 10 loading to the air chambers as well as by the contours of the chambers themselves.

To preclude any such danger, another passage 11 is formed in the bearing box 3, in accordance with the present invention, to communicate the both air chambers 7 and 8. This embodiment alters the course of movement of the air due to the pressure difference between the air chambers 7 and 8; the air bypasses rolling-contact bearing 2 and the gaps between the inner peripheral walls 5', 6' and the rings 12a, 12b where the flow resistance is great, and flows, instead, through the passage 11 where it encounters less flow resistance. Accordingly, the difference between the air pressures in the air chambers 7 and 8 is immediately eliminated and the two pressures are equalized. Hence the pressure distribution in the bearing assembly surrounded by the air chambers 7 and 8 is made uniform, and there is no longer a flow of air through any portion of the rolling-contact bearing 2, thus precluding any possibility of the grease from the bearing 2 being carried away by the air into either air chamber.

As the motor runs at a high speed and its rotor attains an increased fanning action, the pressure of air around the rotating shaft 1 drops, even down to $-250$ mmAq in an extreme case. If such is the case, the air from the air chamber 7 will be drawn out rather vigorously into the motor through the gap between the ring 12a and the bearing box 3 which forms the air chamber 7. The volume of air that is drawn by suction may in some cases exceed the normal air supply to the air chamber 7. Then, the air from the air chamber 8, too, flows into the air chamber 7 via the passage 11, and thence into the motor through the gap between the ring 12a and the bearing box 3. Since the air chambers 7 and 8 are communicated to each other with the passage 11 as already described, the air pressures in the two chambers remain equal despite any vigorous flow of air into the motor, and the distribution of air pressure around the antifriction bearing 2 which is surrounded by the air chambers 7 and 8 is uniform. If the air pressure in the motor drops to $-250$ mmAq, therefore, the air pressure around the rolling-contact bearing 2 surrounded by the air chambers 7 and 8, where the pressure distribution undergoes little change, may be fairly lower than the atmospheric pressure. As a result, the air pressures in the air chambers 7 and 8 will drop below the pressure in the adjacent gear box 24, so that the air is drawn by suction from the gear box 24 into the air chamber 8 through the gap 29, and thence into the motor through the passage 11 and the air chamber 7. At this time, the flowing air carries with it the mineral oil or gear compound from the gear box 24 into the air chamber 8. The lubricant thus taken out may adhere solidly to the surrounding wall of the passage 11 and may even intrude deep into the motor. In this way the mineral oil or gear compound may contaminate the interior of the motor or clog the passage 11. Even worse drawbacks are that the mineral oil or gear compound once flown into the air chamber 8 may thence naturally leak into the bearing 2 through the gap between the peripheral wall 6' and the ring 12b to mix with the grease of the bearing, thereby deteriorating the lubricant while, at the same time, reducing the volume of the mineral oil or gear compound in the gear box 24 within a short period of time.

Shown in FIG. 4 is another embodiment of the invention which is adapted for an extreme drop of the air pressure around the rotating shaft to a negative value. Between the motor and the air chamber 7 provided in the portion of the bearing assembly close to the motor there is defined another air chamber 30, so that air can be injected into this chamber, too. In the embodiment shown, the air chamber 30, which is annular-shaped, is defined between the bearing box 3 and a part S of the rotor so as to surround the circumference of the shaft 1. The air chamber 30 is connected to one end of an air passage 31, the other end of which is formed with an air inlet 32 to receive a part of cooling air supply. This construction enables the air that has been introduced through the air inlet 32 and compressed in the air chamber 30 to flow out through the gap between the bearing box 3 and the rotor part S, even if a negative air pressure is produced beforehand around the shaft 1 by the fanning action of the rotor of the motor. Accordingly, the adjacent air chamber 7 is not directly subjected to the negative air pressure in the motor. Although the rather low air pressure in the air chamber 30 may draw in some air from the air chamber 7, the decrease of air in the latter is well made up for with the air supplied through the passages 9 and 10. Thus, the air pressures in the air chambers 7 and 8 can be kept above the atmospheric pressure or high enough to avoid the inflow of air from the gear box 24.

As described hereinabove, the arrangement according to this invention is such that air is jetted out about the portions of each gear box and bearing assembly through which a rotating shaft extends and, therefore, those portions of the components through which the shaft extends can be sealed up simply and durably without employing any special packing or seal means. Even in an arrangement where the shaft extends through a boundary provided between the gear box and bearing assembly, a jet of air is supplied to the boundary zone, so that dissimilar lubricants in the gear box and bearing assembly are kept from mingling and any danger of lubricant deterioration due to such undesirable mixing can be precluded.

Further, in an arrangement which involves two or more points where jets of air are to be supplied, those points are communicated to each other to achieve a well-balanced sealing effect and uniformalize the pressure distribution throughout the entire zone surrounded by such points of air supply.

What is claimed is:

1. A sealing device for a rotary machine including a bearing assembly which has a rolling-contact bearing disposed in a bearing box means for supporting a rotating shaft which extends in both directions therethrough, and lubricant chambers formed on both sides of said bearing, and a gear box means for accommodating gears secured to the bearing box means, said shaft being extended into said gear box, characterized in that annular air chambers opposed to the circumference of the shaft are provided in the portions of the bearing assembly and gear box means into which the shaft extends, each air chamber being disposed outside of each lubricant chamber and communicating therewith, whereby jets of air are supplied to both of said air chambers, said air chambers being provided with passage means for keeping said air chambers in constant communication.

2. A sealing device for a rotary machine according to claim 1, characterized in that the gear box is provided adjacent to said bearing assembly, said gear box communicating with one of said air chambers, said rotating shaft extending into said gear box, whereby air is permitted to enter from the air chamber situated between said bearing assembly and said gear box into said gear box.

3. A sealing device for a rotary machine including a bearing assembly which has a rolling-contact bearing disposed in a bearing box means for supporting a rotating shaft which extends in the both directions therethrough, and lubricant chambers formed on the both sides of said bearing, and a gear box means for accommodating gears secured to the bearing box means, said shaft being extended into said gear box, characterized in that annular air chambers opposed to the circumference of the shaft are provided in the portions of the bearing assembly and gear box means, said annular air chambers being in communication with said gear box means, each air chamber being disposed outside of each lubricant chamber, whereby jets of air are supplied to said air chambers, said air chambers being provided with passage means for keeping said air chambers in constant communication.

4. A sealing device for a rotary machine including a bearing assembly which has a rolling-contact bearing disposed in a bearing box means for supporting a rotating shaft which extends in the both directions therethrough, and lubricant chambers formed on the both sides of said bearing, and a gear box accommodating gears and secured to the stationary parts of the bearing assembly, said shaft being extended into said gear box, characterized in that annular air chambers opposed to the circumference of the shaft are provided in the bearing box means on the both sides of the bearing assembly and are communicated with each other so that air can be injected into said air chambers, and another annular air chamber opposed to the circumference of the shaft is formed outside of the annular air chamber provided in the bearing box means on the side of the bearing assembly away from the gear box whereby a jet of air is supplied to said additional air chamber.

5. A sealing device for a rotary machine according to claim 4, characterized in that said another annular air chamber receives a part of cooling air from the rotary machine.

6. A sealing device for a rotary machine including a bearing assembly which has a rolling-contact bearing supported by a bearing box means for supporting a rotating shaft which extends in both directions therethrough, and lubrication chambers formed on both sides of said bearing, characterized in that at least one annular air chamber opposed to the circumference of the shaft is provided in the stationary bearing box means on both sides of the bearing assembly whereby jets of air are supplied to said chambers, said air chambers provided on both sides of said bearing assembly being communicated to each other, said gear box being provided adjacent to said bearing assembly, said gear box communicating with said one of said air chambers, said rotating shaft extending into said gear box, whereby air is permitted to enter from the air chamber situated between said bearing assembly and said gear box into said gear box, and characterized in that an annular air chamber opposed to the circumference of a separate rotating shaft extending through said gear box is formed on the side wall of said gear box in such a manner that a jet of air is supplied to said air chamber, and a flinger is formed on said separate rotating shaft within said annular air chamber.

7. A shaft sealing installation comprising: a first rotatable shaft, a bearing box means, a rolling-contact bearing means disposed in said bearing box for rotatably supporting said first shaft, at least one lubricant chamber means disposed on each side of said bearing means for supplying lubricant to said bearing means, at least one annular air chamber opening toward the shaft disposed on each side of said bearing means, a gear box means connected to said bearing box means, a second rotatable shaft disposed in said gear box means, means for operatively connecting said first and second rotatable shafts, means for communicating said gear box means with said bearing means, at least one additional annular air chamber disposed adjacent and opening toward said second shaft and means for supplying air to said annular chambers thereby providing an air seal between said bearing assembly and said gear box and between said second shaft and the exterior of the installation.

8. A shaft sealing installation according to claim 7, wherein said annular air chamber disposed on each side of said bearing means are provided with means for keeping said air chamber in constant communication with each other.

9. A shaft sealing installation according to claim 8, wherein said means for communicating said gear box means with said bearing means includes a gap in said gear box means disposed parallel to the axis of said first rotatable shaft.

10. A shaft sealing installation according to claim 8, wherein said constant communication means includes a first substantially U-shaped conduit interconnecting said annular air chambers.

11. A shaft sealing installation according to claim 10, wherein said constant communication means includes a second substantially U-shaped conduit interconnecting said annular air chambers.

12. A shaft sealing installation according to claim 8, wherein a further annular air chamber opening toward said first shaft is provided adjacent one of said at least one annular air chamber disposed on each side of said bearing means and communicates therewith.

13. A shaft sealing installation according to claim 8, wherein said second rotatable shaft is provided with a means for rectifying the air supplied to said at least one additional annular air chamber whereby the air is directed inwardly and outwardly of said gear box means.

* * * * *